US011294723B1

(12) United States Patent
Mathew et al.

(10) Patent No.: US 11,294,723 B1
(45) Date of Patent: Apr. 5, 2022

(54) AUTONOMOUS APPLICATION MANAGEMENT FOR DISTRIBUTED COMPUTING SYSTEMS

(71) Applicant: Sedai Inc., Pleasanton, CA (US)

(72) Inventors: Suresh Mathew, San Ramon, CA (US); Nikhil Gopinath Kurup, Tampa, FL (US); Hari Chandrasekhar, Highlands Ranch, CO (US); Benjamin Thomas, San Jose, CA (US)

(73) Assignee: SEDAI INC., Pleasanton, CA (US)

( * ) Notice: Subject to any disclaimer, the term of this patent is extended or adjusted under 35 U.S.C. 154(b) by 0 days.

(21) Appl. No.: 17/387,984

(22) Filed: Jul. 28, 2021

Related U.S. Application Data

(60) Provisional application No. 63/214,783, filed on Jun. 25, 2021, provisional application No. 63/214,784, filed on Jun. 25, 2021.

(51) Int. Cl.
*G06F 9/50* (2006.01)
*G06N 3/08* (2006.01)

(52) U.S. Cl.
CPC .......... *G06F 9/5016* (2013.01); *G06F 9/5094* (2013.01); *G06N 3/08* (2013.01); *G06F 2209/501* (2013.01)

(58) Field of Classification Search
None
See application file for complete search history.

(56) References Cited

U.S. PATENT DOCUMENTS

| | | | | |
|---|---|---|---|---|
| 9,356,883 | B1* | 5/2016 | Borthakur | ........... H04L 41/5051 |
| 10,374,919 | B2* | 8/2019 | Pai | ........... H04L 43/16 |
| 10,432,722 | B2* | 10/2019 | Jain | ........... G06F 9/5077 |
| 10,742,750 | B2 | 8/2020 | Johnson, II et al. | |
| 2021/0096915 | A1 | 4/2021 | Patel et al. | |

\* cited by examiner

*Primary Examiner* — Eric C Wai
(74) *Attorney, Agent, or Firm* — Yantra Patents LLC; Anand P Narayan

(57) ABSTRACT

Implementations described herein relate to methods, systems, and computer-readable media to manage a computing resource allocation for a software application. In some implementations, a method may include receiving first metric data associated with the software application, determining, based on the first metric data, that an allocation of a computing resource for the software application is to be reduced from a first level of allocation, increasing allocation of the computing resource to a second level of allocation greater than the first level of allocation; executing the software application on the distributed computing system at the second level of allocation, obtaining second metric data based on execution of the software application at the second level of allocation, and reducing allocation to a third level that is lower than the first level based on a determination that the second metric data does not indicate a performance improvement for the software application.

12 Claims, 12 Drawing Sheets

AUTONOMOUS APPLICATION MANAGEMENT FOR DISTRIBUTED COMPUTING SYSTEMS

CROSS-REFERENCE TO RELATED APPLICATIONS

This application claims priority to U.S. Provisional Patent Application No. 63/214,783, filed 25 Jun. 2021, titled "AUTONOMOUS MANAGEMENT OF COMPUTING SYSTEMS" and to U.S. Provisional Patent Application No. 63/214,784, filed 25 Jun. 2021, titled "CLOUD MANAGEMENT SYSTEM WITH AUTONOMOUS ABERRANT BEHAVIOR DETECTION" both of which are incorporated by reference herein in their entirety.

TECHNICAL FIELD

Embodiments relate generally to autonomous application and computing resource management, and specifically to techniques for autonomous and intelligent management of software applications in distributed computing systems.

BACKGROUND

Some computing systems utilize distributed computing architectures, e.g., cloud based systems to host applications. The applications may be hosted across multiple computer systems that are operated by different service providers, and in many cases, using a variety of computing devices.

Some distributed computing architectures are configurable whereby a user, e.g., enterprise users are able to specify a computing resource allocation setpoint, e.g., memory, which may be associated with a particular cost of operation.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method to manage a computing resource allocation for a software application implemented on a distributed computing system. The method also includes receiving first metric data associated with the software application executing on a distributed computing system; determining, based on the first metric data, that an allocation of a computing resource for the software application is to be reduced from a first level of allocation; increasing allocation of the computing resource for the software application to a second level of allocation greater than the first level of allocation; executing or causing the execution of the software application on the distributed computing system at the second level of allocation; obtaining second metric data based on execution of the software application on the distributed computing system at the second level of allocation; and reducing allocation of the computing resource to a third level that is lower than the first level based on a determination that the second metric data does not indicate a performance improvement for the software application when compared to the first metric data. Other embodiments of this aspect include corresponding computer systems, apparatus, and computer programs recorded on one or more computer storage devices, each configured to perform the actions of the methods.

Implementations may include one or more of the following features. The method may include: obtaining historical metric data associated with the software application; programmatically analyzing the obtained historical metric data and the first metric data; and determining that the allocation of the computing resource is to be reduced from a first level of allocation based on the programmatic analysis. The computing resource is memory allocated to the software application on the distributed computing system. A quantity of central processing units (CPU) power allocated to the software application is based on a corresponding allocation of memory allocated to the software application. The distributed computing system is a serverless computing system, and where the software application is a function or package configured to be executable on the serverless computing system. Determining that the allocation of the computing resource is to be reduced from the first level of allocation is based on a comparison of the first metric data to the obtained metric data for the second software application at the plurality of allocation setpoints; and determining an optimal allocation setpoint for the computing resource based on the comparison. Determining, based on the first metric data, that an allocation of a computing resource for the software application is to be reduced from a first level of allocation may include: providing the first metric data to a trained machine learning model; and receiving, from the trained machine learning model, a second level of allocation for the computing resource, where the second level of allocation is lower than the first level of allocation. Determining that the allocation of a computing resource for the software application is to be reduced from a first level of allocation may include determining a second level of allocation for the execution of the software application, and where a total cost of execution of the software application is lower at the second level of allocation when compared to the first level of allocation, and where the performance of the software application at the second level of allocation is lower when compared to the first level of allocation, and where the performance of the software application at the second level of allocation meets a service level performance threshold. Implementations of the described techniques may include hardware, a method or process, or computer software on a computer-accessible medium.

One general aspect includes a method to manage a computing resource for a distributed computing system. The method also includes executing a first test function using the distributed computing system at a first plurality of allocation setpoints for the computing resource; based on the execution, obtaining one or more performance metrics for the first test function for each setpoint of the first plurality of allocation setpoints; training a machine learning model based on the obtained one or more performance metrics; and utilizing the trained machine learning model to manage the computing resource for a second function. Other embodiments of this aspect include corresponding computer systems, apparatus, and computer programs recorded on one or more computer storage devices, each configured to perform the actions of the methods.

Implementations may include one or more of the following features. The method where training the machine learning model may include providing feedback to the machine learning model based on a comparison between a predicted performance metric and a corresponding obtained performance metric of the one or more performance metrics. Training the machine learning model may include training the machine learning model to determine an order of a polynomial function that characterizes performance of the first test function based on a fit of each of the obtained performance metrics over the first plurality of allocation setpoints. Utilizing the trained machine learning model to manage the computing resource for the second function may include: receiving the second function to be optimized for the computing system; executing the second function at a second plurality of allocation setpoints for the computing resource, where the second plurality of allocation setpoints may include a fewer number of setpoints compared to the first plurality of allocation setpoints; obtaining one or more performance metrics for the second function for each of the second plurality of allocation setpoints; fitting a polynomial function of the determined order to the obtained performance metrics for the second function for each of the second plurality of allocation setpoints; determining an optimal allocation setpoint for the one or more performance metrics based on the fitted polynomial function; and providing a recommendation of a setpoint for the computing resource for the second function based on the determined optimal allocation setpoint. The method may include implementing the recommendation of the allocated resource setpoint for the second function. The recommendation is a change from a first level of allocation, and where implementing the recommendation may include: obtaining first metric data based on the second function executing the first level of allocation; increasing allocation of the computing resource to a second level of allocation greater than the first level of allocation; executing or causing the execution of the second function on the distributed computing system at the second level of allocation; obtaining second metric data based on the second function executing on the distributed computing system; and reducing allocation of the computing resource to a third level of allocation lower than the first level of allocation based on a determination that the second metric data does not indicate an improvement over the first metric data. Fitting the polynomial function of the determined order to the obtained performance metrics for the second function further may include fitting the polynomial function to the obtained performance metrics for the second function such that no portion of the fitted polynomial based on the second function intersects with the polynomial function based on the test function. Training the machine learning model based on the obtained one or more performance metrics may include fitting a third order polynomial function to the obtained performance metrics over the first plurality of setpoints. Implementations of the described techniques may include hardware, a method or process, or computer software on a computer-accessible medium.

One general aspect includes a non-transitory computer-readable medium may include instructions that. The non-transitory computer-readable medium also includes receiving first metric data associated with a software application executing on a distributed computing system; determining, based on the first metric data, that an allocation of a computing resource for the software application is to be reduced from a first level of allocation; increasing allocation of the computing resource for the software application to a second level of allocation greater than the first level of allocation; executing or causing the execution of the software application on the distributed computing system at the second level of allocation; obtaining second metric data based on execution of the software application on the distributed computing system at the second level of allocation; and reducing allocation of the computing resource to a third level that is lower than the first level based on a determination that the second metric data does not indicate a performance improvement for the software application when compared to the first metric data. Other embodiments of this aspect include corresponding computer systems, apparatus, and computer programs recorded on one or more computer storage devices, each configured to perform the actions of the methods.

Implementations may include one or more of the following features. The non-transitory computer-readable medium where the computing resource is memory allocated to the software application on the distributed computing system. The distributed computing system is a serverless computing system, and where the software application is a function or package configured to be executable on the serverless computing system. The operations further may include: obtaining metric data for a second software application at a plurality of allocation setpoints for the computing resource, and where determining that the allocation of the computing resource is to be reduced from the first level of allocation is based on a comparison of the first metric data to the obtained metric data for the second software application at the plurality of allocation setpoints; and determining an optimal allocation setpoint for the computing resource based on the comparison. Implementations of the described techniques may include hardware, a method or process, or computer software on a computer-accessible medium.

DETAILED DESCRIPTION

Figure 1:
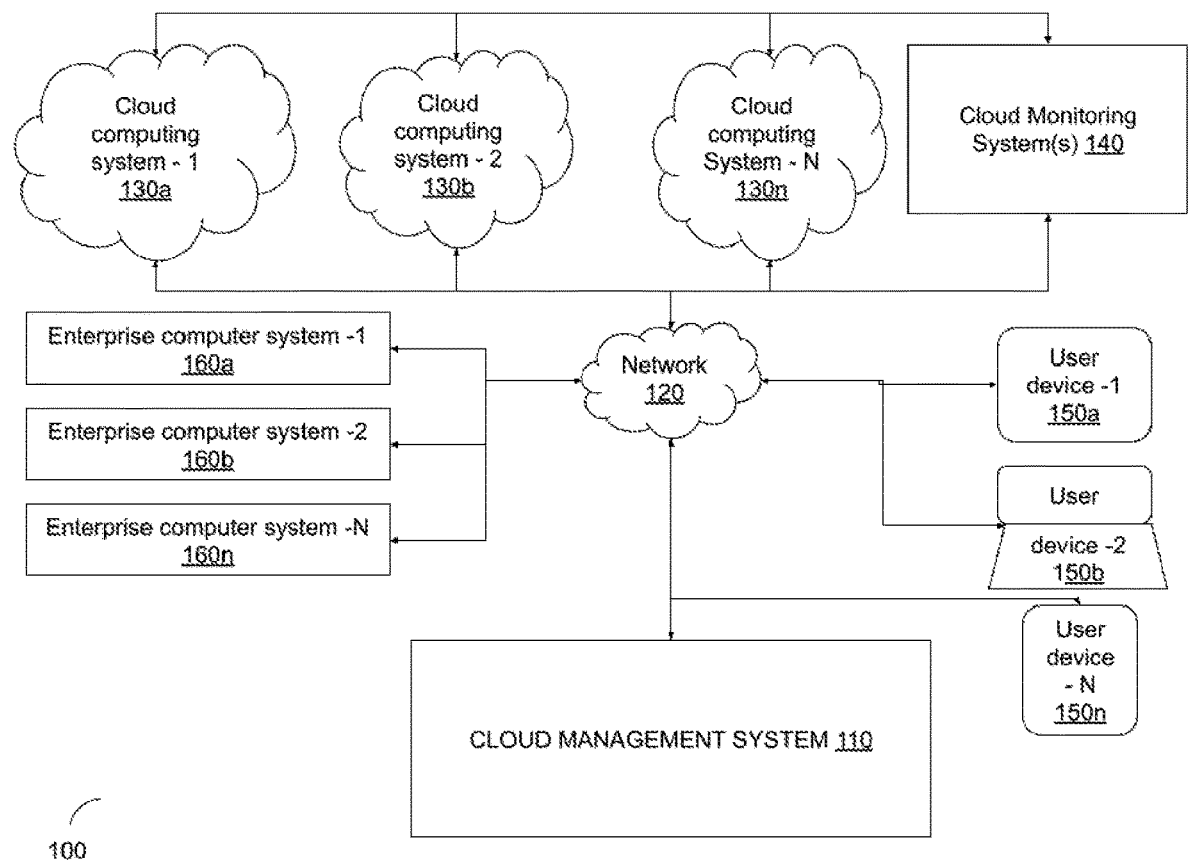
FIG. 1 is a diagram of an example distributed computing environment, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation/embodiment described may include a particular feature, structure, or characteristic, but every implementation/embodiment may not necessarily include the particular feature, structure, or characteristic. Moreover, such phrases are not necessarily referring to the same embodiment. Further, when a particular feature, structure, or characteristic is described in connection with an implementation or embodiment, such feature, structure, or characteristic may be implemented in connection with other implementations or embodiments whether or not explicitly described.

Today's extremely competitive global market calls for a high degree of business agility and responsiveness to customer needs and tastes. The introduction rate of new features via software releases has steadily increased to meet ever-evolving customer needs, and innovative computing architectures such as cloud native microservervice architectures are becoming the new norm. Releases have risen to hundreds per month with a consequent impact on the roles and responsibilities of Site Reliability Engineers (SRE) who are tasked with managing the computing environment.

Technical outages to computing systems can have significant business implications. For example, Costco warehouse, with over 98.6 million members, had one of its biggest outages on Thanksgiving Day in 2019, impacting close to 2.6 million of its customers and causing more than $11 million in losses. On the same day, Home Depot, H&M, and Nordstrom customers too reported issues with their e-commerce sites. According to the Information Technology Industry Council (ITIC), 86% of the companies estimate that an hour of downtime can cause a greater than $300,000 revenue loss, and for 34% of companies, anywhere from $1 to $5 million.

RetailTouchPoints reported that for Black Friday shoppers specifically, nearly half of consumers (49%) say they will abandon their cart if they receive any error message during checkout that prevents them from completing their purchase. Shoppers who have to wait six seconds are 50% less likely to make a purchase, and 33% of shoppers will visit a competitor if the site they are currently on is slow to load.

For more critical services like health care, the stakes are much higher. Dexcom, a leader in continuous glucose monitoring systems, had a service outage for more than 24 hours, which resulted in irate customers and lives at risk.

With businesses increasingly earning larger revenue shares from online commerce, CTOs and SRE organizations are under tremendous pressure to achieve high levels of site availability at the most optimal costs—all while satisfying ever-increasing regulatory pressures.

In the pre-DevOps/Cloud era, monolithic services designed site architectures for product and software releases once or twice a year. However, businesses' modern needs now dictate faster responses to market signals. With the advent of cloud technology and simultaneous services segmentation, product features can be released quicker than ever—sometimes more than 50 times per year. But alongside an increased churn rate for features and versions comes elevated management costs.

Cloud adoption, virtualization, and DevOps maturity have led to agile deployment strategies and reduced time to market (TTM), which allows businesses to compete more effectively. Automation played a vital role on the road to achieving agile deployment—processes transitioned from being imperatively managed by a set of system administrators with command line interface, to being declaratively managed by a much smaller team of administrators in a distributed framework.

Organizations commonly utilize multiple cloud providers to implement their computing solutions. For example, an organization may utilize offerings from one or more providers, e.g., Amazon Web Services (AWS), Google Cloud Platform (GCP), Microsoft Azure etc., to implement their solution architecture. Metrics associated with their solution architecture and applications running over their architecture may be provided by multiple monitoring providers.

A typical software product implemented via a microservices based architecture may include hundreds of underlying applications. For example, a money transfer application may include multiple microservices operating using a combination of parallel and sequential processes, e.g., a client login microservice, a pre-validation check microservice, a microservice that performs funds availability verification, a risk analysis microservice to investigate fraud or other unauthorized transaction, etc.

Each microservice may be executed by a different codeset, implemented and managed by different teams, with their own development cycles, releases, etc. Each of the microservices may utilize its own metric or set of metrics to monitor performance and health of the microservice and/or application.

During run-time, issues and problems may occur at any of multiple levels, e.g., runtime errors or performance issues caused by code issues due to a new release, integration issues of a particular microservice with other microservices, integration issues with third party providers, network issues, hardware issues, etc.

This disclosure describes a cloud management platform to autonomously monitor distributed computer systems and their computing resource allocation settings, detect abnormal system behaviour and anomalies, and autonomously generate alerts and recommendations. In some implementations, autonomous remediation may be undertaken by the cloud management platform.

Unlike traditional remediation techniques and run book automation platforms that provide threshold based automation, advanced machine learning techniques are utilized herein to detect issues with an application centric approach. The cloud management platform can integrate with various Cloud/PaaS providers and can auto detect (infer) an application topology with minimal user intervention. Integration with multiple monitoring providers is enabled and the metric data obtained can be overlaid on the inferred application topology. Application behavior is continually monitored and clustering techniques (e.g., self correcting bounded clustering) may be utilized to identify misbehaving instances.

Another limitation commonly encountered with monitoring providers is collection delay. Monitoring providers commonly provide metric data that includes a data collection delay, e.g., a 15-20 minutes data collection delay, which effectively leads to delayed detection of aberrant (abnormal)

application behavior. For example, problems may be brought to notice of SREs after the collection delay. Per techniques of this disclosure, machine learning models are utilized to learn application behavior over time. The ML model(s) can predict a current (estimated) state of one or more applications and thereby compensate for missing data due to the collection delay.

Autonomous system characteristics in a cloud context are incorporated into the cloud management platform which utilizes an influx of data streams, e.g., time-series data of metrics, to build a layer of intelligence via a core decision engine that utilizes probability theory and applies machine learning techniques. The cloud management platform is self-learning and utilizes a self-correcting model to seamlessly manage cloud platforms with a focus on explainable decisions.

Abnormal and aberrant (anomalous) behavior of applications may arise from specific anomalous instances, errors in the application codebase, network issues, etc. Per techniques of this disclosure, a trained ML model is utilized to analyze application level problems and instance level problems and provide a recommendation based on identification of a problem source.

A two-tiered approach is utilized, whereby an alert engine generates signals and/or scores based on identification of instance-level and application-level outlets from the monitored metrics for each configured application being monitored. The generated signals and/or scores are then provided to a core decision engine, which utilizes additional historical data and feedback from previously provided recommendations and/or actions to provide recommendations for a current scenario.

The cloud management platform (system) may also be utilized to determine optimal operating points for a cloud based implementation, and to generate recommendations for resource allocation during utilization of distributed computing systems.

Machine learning techniques are utilized to assess client computing system topology, resource allocation settings, and performance metrics to proactively recommend operating settings to ensure that software applications remain highly efficient, secure, available, and cost-effective.

For example, in the case of a serverless computing implementation, e.g. Lambda instances, a recommendations feature of the cloud management platform, would automatically identify under-utilized memory within the implementations and may recommend a proactive scale down of the memory allocated to a software application (function).

Optimization and management of resource allocation is based on benchmarking of the distributed computing system using a known software application, e.g., a test function. In a typical distributed computing set up, a customer user selects a memory allocation setting for their application, which comes with a certain cost for operation, e.g., higher memory allocation incurs a greater cost per unit of time that the computing resources are utilized. At the same time, a higher memory allocation may enable a software application to execute in a smaller amount of time, which may more than compensate for the greater unit cost. An amount of CPU power may also be specified by the customer user, though in many cases, the CPU allocation may automatically be based on the selected memory allocation setting and be opaque to the customer.

Doubling a memory allocation setting may have an unpredictable impact on a time of execution, a user experience metric, or any one of numerous metrics that are critical from a business perspective. Conservatively selecting a high memory setting may incur unnecessary costs. A technical problem in the software arts is an optimal selection of a computing resource allocation setting, e.g., memory, for a given software application and/or infrastructure provider.

Per techniques of this disclosure, for a given implementation of a distributed computing system such as a serverless system, an optimal (sweet spot) memory allocation is determined for a software application (function) that is to be executed in the distributed computing system.

In some implementations, an optimal memory allocation or other computing resource setting may be determined for each function taking into account performance requirements, service level objectives (SLO), and cost considerations.

In some implementations, a test function may be selected for performing a benchmark study of a distributed computing system. The test function may be any function, e.g., a mathematical operation that takes a finite time for completion. The test function is executed at a set of allocation setpoints that span an available set of resource allocation setpoints. For example, in a serverless system where memory is the primary resource being set (selected), the test function may be executed at a range of set points, e.g. starting from minimum of about 128 MB to an upper bound of about 10 GB. At each setpoint, a performance metric, e.g., latency or time of execution is obtained.

A machine learning model may be trained based on the setpoints and the corresponding performance metrics. In some implementations, a mathematical model may be determined based on the obtained data to characterize and benchmark the distributed computing system behavior.

When a software application that is to be executed over the same (or similar) distributed computing system is received, it is then compared to the benchmark obtained. An actual invocation history, resource allocation settings, performance metrics, etc., of the software application may be obtained, if it has been previously executed in the distributed computing system Based on the obtained data, characteristics of the particular software application, e.g., function, are determined. The software application may be optionally executed at additional setpoints if it is determined that some setpoints are missing.

A comparison of the obtained data for the software application and the benchmark data is utilized to extrapolate the software application behavior over the complete set of available resource allocation setpoints, and to determine a ML or mathematical model for the software application. Based on the ML or mathematical model, an optimal setpoint for the resource is determined, e.g., based on a point of slope change, or other inflection point, along with cost and performance constraints.

FIG. 1 is a diagram of an example distributed computing environment, in accordance with some implementations. FIG. 1 illustrates an example system environment 100, in accordance with some implementations of the disclosure and illustrates a block diagram of an environment 100 wherein a cloud management service might be used. FIG. 1 and the other figures utilize similar (like) reference numerals to identify like elements. A letter after a reference numeral, such as "130," indicates that the text refers specifically to the element having that particular reference numeral. A reference numeral in the text without a following letter, such as "130," refers to any or all of the elements in the figures bearing that reference numeral (e.g., "130" in the text refers to reference numerals "130*a*," "130*b*," and/or "130*n*" in the figures).

The system environment 100 includes a cloud management system 110, which may include a variety of computer subsystems. Each of the subsystems can include a set of networked computers and devices.

The cloud management system is utilized to manage one or more distributed computing systems that are associated with one or more enterprise computer systems 160a, 160b, and 160n that utilize one or more cloud computing systems offered by respective infrastructure providers, 130a, 130b, and 130n that are connected via network 120.

Environment 100 may also include user devices 150a, 250b, and 150n that are utilized by users to access and/or execute one or more applications on the cloud computing systems. The cloud management system 110 itself may be implemented as a cloud-based system that is supplied and hosted by one or more third-party providers, and is accessible to users, e.g. system administrators and/or system reliability engineers (SREs), etc., via a variety of connected devices.

User devices 150 and enterprise computer system 160 may include any machine, system, or set of machines, systems that are used by an enterprise and users. For example, any of user devices 150 can include handheld computing devices, mobile devices, servers, cloud computing devices, laptop computers, work stations, and/or a network of computing devices. As illustrated in FIG. 1, user devices 150 might interact via a network 120 with a cloud computing system 130 that provides a service.

Cloud computing systems 130, cloud management system 110, and enterprise computer system 160 may utilize captive storage and/or cloud based storage. In some implementations, on-demand database services may be utilized. The data store may include information from one or more tenants stored into tables of a common database image to form a multi-tenant database system (MTS). A database image may include multiple database objects. A relational database management system (RDMS) or the equivalent may execute storage and retrieval of information against the database object(s).

Access to cloud management system 110, enterprise computer systems 160, cloud monitoring system 140, and cloud computing system 130 may be controlled by permissions (permission levels) assigned to respective users. For example, when an employee or contractor associated with a cloud management system 110 is interacting with enterprise computer system 160, cloud monitoring system 140, user device(s) of the employee or contractor is provided access on the basis of permissions associated with that employee or contractor. However, an administrator associated with cloud management system 110 may be provided additional access privileges based on access privileges allotted to that administrator. In user systems with a hierarchical organization level, users at a certain permission level may have access to applications, data, and database information accessible to a lower permission level user, but may not be provided access to certain applications, database information, and data accessible to a user at a higher permission level. Thus, users can have different capabilities with regard to accessing and modifying application and database information, depending on a user's security or permission level.

Network 120 is any network or combination of networks of computing devices that enable devices to communicate with one another. For example, network 120 can be any one or any combination of a LAN (local area network), WAN (wide area network), telephone network, wireless network, point-to-point network, star network, token ring network, hub network, or other appropriate configuration.

The computer systems may be connected using TCP/IP and use other common Internet protocols to communicate, such as HTTP, FTP, AFS, WAP, etc. Users may access the systems by utilizing different platforms and frameworks, e.g., by using single-page client applications that use HTML and TypeScript.

An application execution environment as described herein can be any software environment that supports execution of a software application. For example, an application execution environment supported herein may be an operating system (e.g., Linux, Windows, Unix, etc.), a hypervisor that supports execution of one or more virtual machines (e.g., Xen®, Oracle VM Server, Microsoft Hyper-V™, VMWare® Workstation, VirtualBox®, etc.), a virtual computer defined by a specification, e.g., a Java Virtual Machine (JVM), an application execution container (e.g., containers based on Linux CGroups, Docker, Kubernetes, CoreOS, etc.), a process executing under an operating system (e.g., a UNIX process), etc. In some implementations, the application execution environment may be a software application, e.g., that is configured to execute on server hardware.

Techniques of this disclosure can be applied to a wide variety of deployment types, e.g., to distributed computing systems that utilize stateless containers, stateful containers, serverless deployments, etc.

Figure 2:
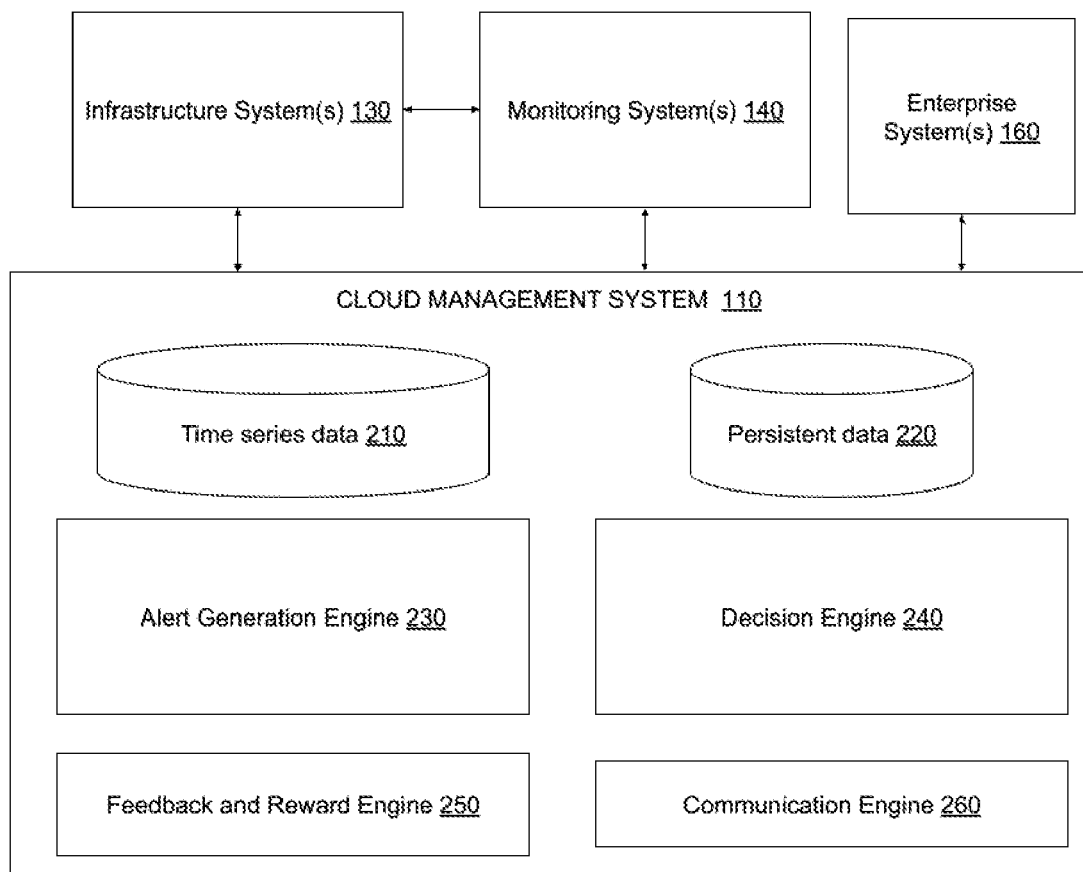
FIG. 2 illustrates a cloud management system, in accordance with some implementations.

FIG. 2 illustrates a cloud management system, in accordance with some implementations.

Cloud management system 110 may include subsystems configured for different functionality. In some implementations, cloud management system 110 may include an alert generation engine 230, a decision engine (core engine) 240, a feedback and reward engine 250, and a communication engine 260. Cloud management system 110 may also include one or more databases (datastores), for example, a time series database 210, and a persistent database 220.

In some implementations, databases 210 and 220 may be configured as external databases and/or cloud based data storage that is accessible to the cloud management system. In some implementations, the cloud management system 110 is communicatively coupled to one or more infrastructure systems 130, monitoring system(s) 140, and enterprise system(s) 160.

In some implementations, the cloud management system is configured to receive monitoring metrics associated with applications implemented on and/or executing on one or more infrastructure systems (cloud computing systems). The monitoring metrics may be received directly from the infrastructure systems and/or monitoring system(s) associated with respective infrastructure systems.

Figure 3:
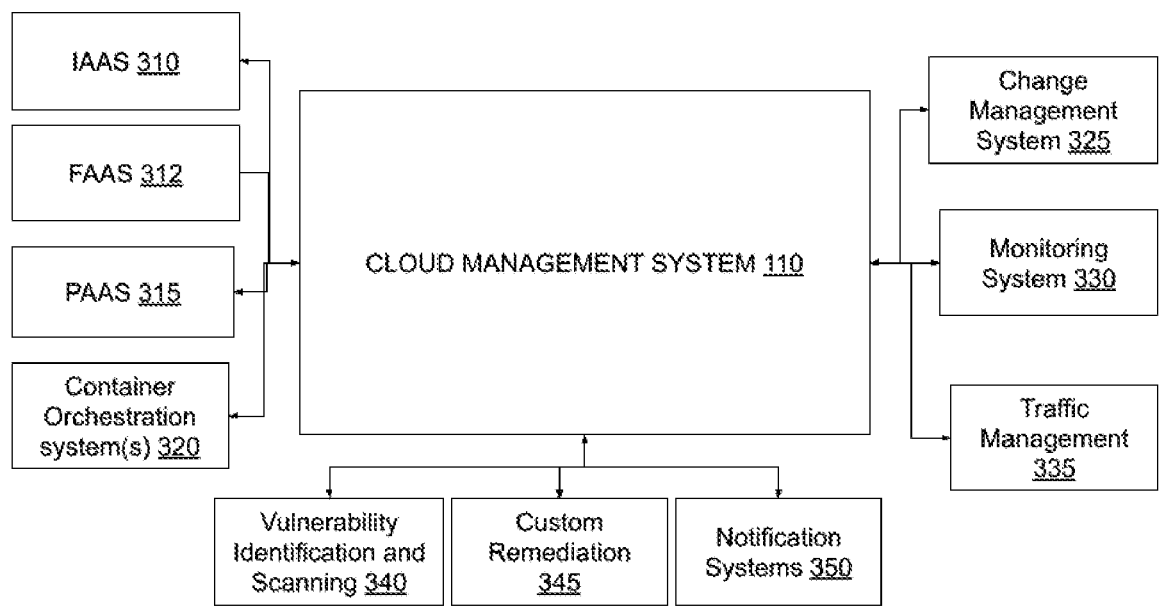
FIG. 3 is a diagram that depicts an example of a cloud management system and example interacting systems, in accordance with some implementations.

FIG. 3 is a diagram that depicts an example of a cloud management system and interacting computing systems, in accordance with some implementations.

As depicted in FIG. 3, the cloud management system is configured to interact with multiple systems for various purposes. For example, the cloud management system may be coupled to Infrastructure as a service (IAAS) systems 310 that enable an enterprise to lease or rent servers for compute and storage resources. The cloud management system may be coupled to IAAS systems located in different geographical locations.

In some implementations, the cloud management system may be coupled to Function as a service (FAAS) systems 312, also referred to as serverless systems that enable an enterprise to execute one or more functions as a service, and where payment for the use of the infrastructure is made on a per-use-basis, based on units of time consumed and a cost that may be based on an allocation of computing resource.

FAAS systems enable enterprises to only pay for infrastructure at a time of use, and not during idle times. Additionally, the infrastructure sizing, etc. is implemented by the service provider, thereby freeing up the enterprise from costs and efforts associated with infrastructure management.

In some implementations, the cloud management system may be coupled to Platform as a service (PAAS) systems 315 that enable enterprises to lease servers as well as receive access to other development and deployment resources, e.g., middleware, development tools, database management systems, business analytics services, etc.; to Container Orchestration systems 320 that enable automation of containerized workloads, e.g., Kubernetes, Docker Swarm, Apache Mesos, etc.

In some implementations, the cloud management system may be coupled to one or more Change Management System(s) 325 that enable enterprises to manage change and release processes and to meet their auditing and compliance requirements; to one or more monitoring systems 330; and to Traffic Management System(s) 335 that are utilized to manage cloud traffic at various layers.

In some implementations, the cloud management system may be coupled to a vulnerability identification and scanning system 340, e.g., which may operate upon alerts received from the cloud management system to detect security issues/flaws and or attacks.

In some implementations, the cloud management system may be coupled to a Custom Remediation System 345, operable to perform custom remediations based on detected anomalies.

One or more notification systems 350, e.g., Slack, pager systems, email systems, etc. may be coupled to the cloud management system for the transmission of alerts, messages, and notifications to users.

Figure 4A:
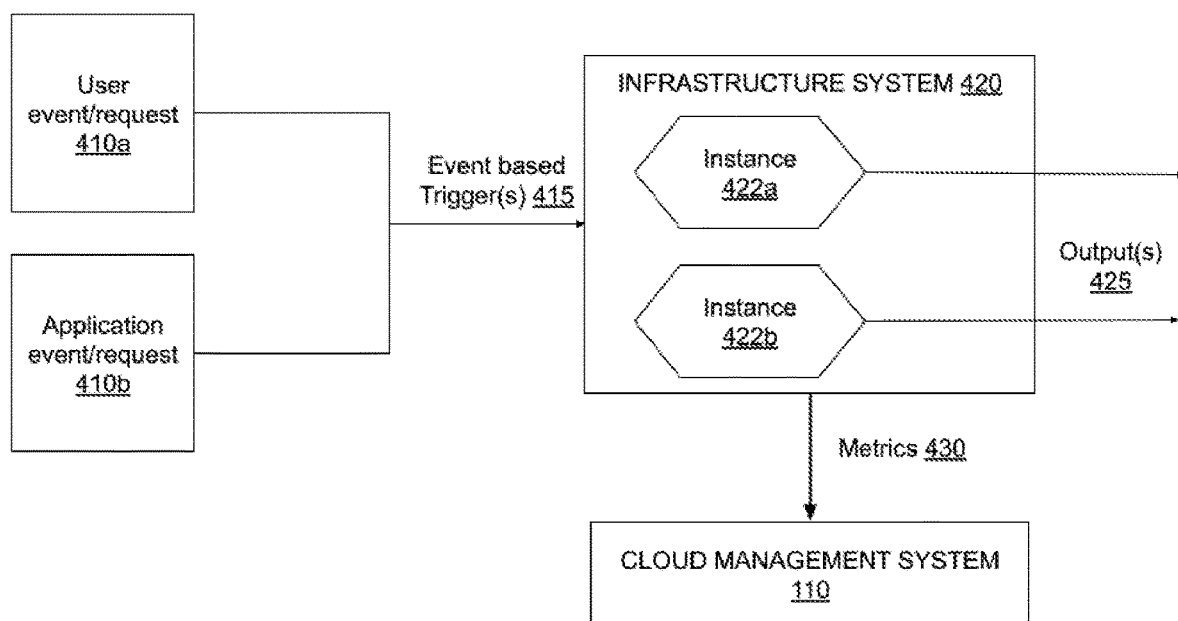
FIG. 4A depicts an example implementation of a serverless function in a distributed (cloud) computing environment, in accordance with some implementations.

FIG. 4A depicts an example implementation of a serverless function in a distributed (cloud) computing environment, in accordance with some implementations.

A serverless function environment, sometimes referred to as a Function as a service (FAAS), enables a user to utilize infrastructure hosted by a third party provider. The execution of the function is based on a trigger/event trigger based on a user or application action. For example, as depicted in FIG. 4A, event based triggers 415 may originate from a user request or event 410a that may originate on a user device. For example, a user may initiate an upload of a picture from their mobile device, which may serve as an event trigger.

Event based triggers may also originate based on an application event/request 410b, which may be another software application that triggers an event request.

Based on the event trigger, an infrastructure system 410 may invoke an instance 422a or 422b and execute a function associated with the event trigger. The code for the function may be typically previously provided by the enterprise, e.g., as a container, code, function call, etc. For example, in the scenario described earlier, the function may be a codeset (code) that compresses the uploaded picture, and stores it in a database for subsequent access.

Each instance or execution of the function may generate one or more outputs, writes to one or more database(s), output to user devices etc.

Per techniques of this disclosure, one or more performance metrics 470 may be provided to the cloud management system 110, on a continuous, periodical, or indirectly via a database or a monitoring system.

The metrics may include data that is aggregated as well as individual data points, and may include metrics such as arrival data for requests and/or queries that trigger the function(s), latency for each request, runtime, memory utilized, start-up time. In some implementations, the metrics may also include costs associated with the execution of the function.

Figure 4B:
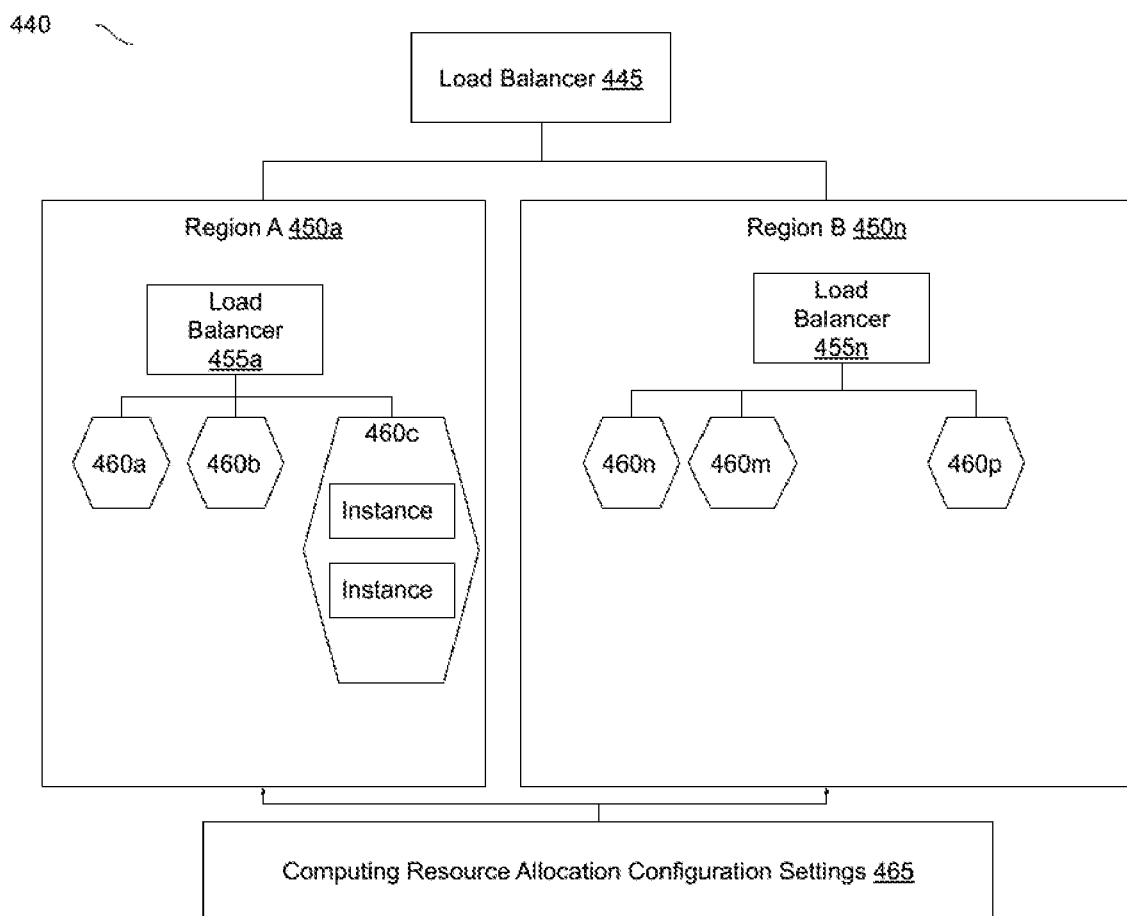
FIG. 4B depicts an example topology within a distributed (cloud) computing environment, in accordance with some implementations.

FIG. 4B depicts an example topology within a distributed (cloud) computing environment, in accordance with some implementations. This example topology may be utilized as part of a cloud based implementation for one or more enterprise applications.

Distributed computing environments are commonly distributed over geographical regions to serve a diverse set of users, with dedicated computing resources earmarked for processing applications associated with a particular region. Within each region, one or more cloud computing systems may be utilized to serve and process applications. Load balancers at a global regional level are utilized to distribute the computing load evenly across available computing resources.

A first step undertaken by a cloud management platform is the discovery of a site (e.g., a client site) and charting of its topology. Subsequently, a complete and holistic state of all applications and infrastructure is registered, which enables complete observability and permits the system to become self-aware. Application tags for each application may be utilized to infer a particular site's infrastructure as well as to create custom profiles.

In this illustrative example, an example topology 440 of the computing environment is depicted in FIG. 4B. A load balancer 445 at the global level is utilized to receive requests, e.g., http requests, etc., from users and distribute it to regional computing clusters 450a or 450n.

Within each region, a load balancer may be utilized to distribute computing tasks to available resources. For example, load balancer 455a may be utilized in region 450a, and load balancer 455n may be utilized in region B.

Based on the type of requests, the load balancers may distribute tasks to available virtual machines within the cluster. Specialized management tools and software may be available for the distribution of tasks to resources.

In some implementations, a virtual machine may be utilized for only one type of application, whereas in other implementations, a virtual machine may be utilized for multiple types of applications, and even multiple applications from multiple client users.

Specific infrastructure providers may utilize different techniques and tools to track assignment of computing tasks to resources. For example, in some implementations, a load balancer may maintain a list of currently executing tasks, and alternately, a history or log of tasks processed as well.

In some other implementations, e.g., containerized systems, a state of a cluster of compute resources may be represented as objects that describe what containerized applications are running on which nodes, resources allocated to those applications, and any associated policies.

In some implementations, computing resources may be configurable. For example, in an environment that utilizes virtual machines, a quantity of memory or CPU allotted to each virtual machine may be configurable. Configurable environments may provide advantages by adjusting the resources based on the type of loads being handled. Configuration settings may be stored and/or adjusted autonomously or via human intervention. In FIG. 4B, the settings are depicted as being controlled via Computing Resource Allocation Configuration Settings 465, which may be accessed by/via the cloud management system.

Figure 4C:
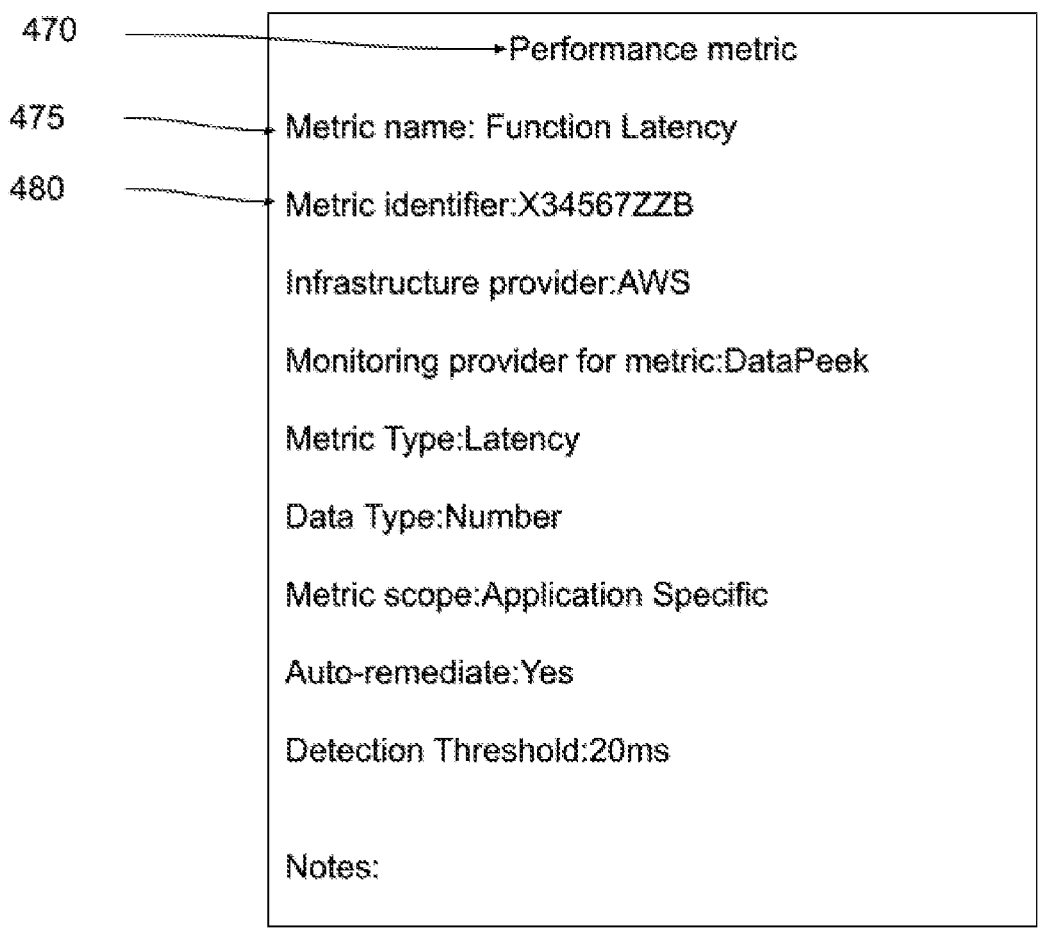
FIG. 4C depicts an example performance metric record utilized in monitoring a distributed computing system, in accordance with some implementations

FIG. 4C depicts an example performance metric record utilized in monitoring a distributed computing system, in accordance with some implementations As described earlier, the cloud management system may receive and/or obtain one or more monitoring metrics from a cloud computing system and/or monitoring system associated with one or more applications that are being monitored and managed.

In some implementations, the monitoring metrics may be automatically received by the cloud management system. In some other implementations, the monitoring metrics may be obtained by querying a database, e.g. Prometheus, etc. at periodic intervals.

In this illustrative example, an example monitoring metric record for a performance metric 470 is depicted, with associated attributes; a metric name 475, a metric identifier 480, and other attributes, e.g., an originating infrastructure provider (cloud computing provider) identifier, a monitoring metric provider, a metric type, a data type associated with the monitoring metric, metric scope, an auto remediate field that indicates whether auto remediation should be performed based on the particular metric, a detection threshold for any anomaly detection, and notes associated with a metric.

The list of attributes for the example metric provided above is provided as an example, and is not exhaustive, and specific implementations may utilize additional monitoring metrics for each application being managed/monitored, and some implementations may omit some of the attributes altogether.

Monitoring metrics and their attributes may be specified by a user, e.g., a user or administrator associated with an enterprise system, monitoring system, or cloud computing system provider, or be automatically inferred by the cloud management system.

A suitable user interface may be utilized to enable users to define/specify monitoring metrics and associated attributes. Menu options, e.g. pull-down menu options, etc., may be provided to enable easy user selection of monitoring metric and associated attributes For example, a metric type attribute for a monitoring metric may be specified to be one of a volume, saturation, latency, error, ticket; a data type for a monitoring metric may be specified to be one of a number, a percentage, or a counter; a metric scope for a monitoring metric may be specified to be one of site wide, application specific, load balancer, or instance.

In some implementations, the attributes may be specified by tags that are associated with the monitoring metric and provided by the cloud computing system or the monitoring system that is generating and providing the metrics.

Figure 5:
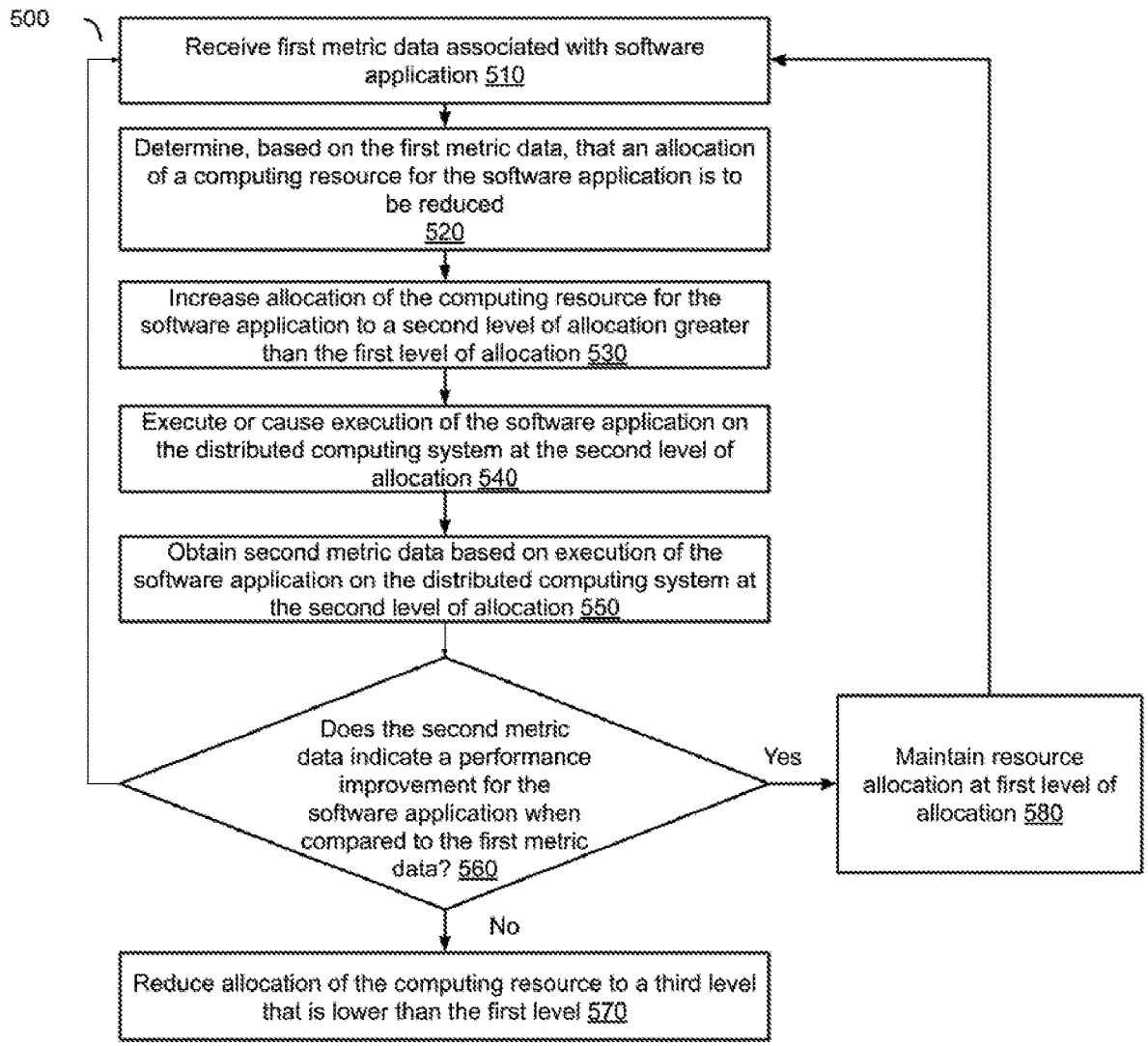
FIG. 5 is a flowchart illustrating an example method to manage a computing resource allocation for a software application implemented on a distributed computing system, in accordance with some implementations.

FIG. 5 is a flowchart illustrating an example method to manage a computing resource allocation for a software application implemented on a distributed computing system, in accordance with some implementations.

The distributed computing system may be a serverless computing system or a virtualized environment, and the software application may be a function or package configured to be executable on the serverless computing system or in the virtualized environment. For example, the distributed computing system may be a containerized computing system, a Kubernetes cluster, a stateless application, a Platform as a service (PAAS), etc.

In some implementations, method 500 can be implemented, for example, on cloud management system 110 described with reference to FIG. 1. In some implementations, some or all of the method 500 can be implemented on one or more enterprise computer systems 160, on cloud computing system 130, on cloud monitoring system 140, as shown in FIG. 1, on and/or on a combination of the systems. In the described examples, the implementing system includes one or more digital processors or processing circuitry ("processors"), and one or more storage devices (e.g., databases 210, 220 or other storage). In some implementations, different components of one or more servers and/or clients can perform different blocks or other parts of the method 500. In some examples, a first device is described as performing blocks of method 500. Some implementations can have one or more blocks of method 500 performed by one or more other devices (e.g., other client devices or server devices) that can send results or data to the first device.

In some implementations, the method 500, or portions of the method, can be initiated automatically by a system. In some implementations, the implementing system is a first device. For example, the method (or portions thereof) can be periodically performed, or performed based on one or more particular events or conditions, e.g., reception of performance metric data, at a predetermined time, a predetermined time period having expired since the last performance of method 500, and/or one or more other conditions or events occurring which can be specified in settings read by the method.

At block 510, first metric data associated with a software application is received.

The first metric data may include one or more metrics, e.g., performance metrics that are being monitored for the software application. For example, the first metric data may include a latency of execution, CPU power consumed, end to end user latency, etc. for the software application.

In some implementations, the first metric data may be specified by a user. In some implementations, credentials for a particular infrastructure provider and/or monitoring provider are obtained, and the metric data (e.g., a plurality of metrics) may include all metrics that are generated for the set of applications associated with a client. In some implementations, a list of available monitoring metrics as well as a set of key metrics may be obtained, e.g., from an enterprise client.

In some implementations, configuration information, credentials, etc., are stored in a persistent database, e.g., data store 220 described with reference to FIG. 2. In some implementations, a list of monitoring metrics may be obtained from cloud providers, whereas, in some other implementations, a list of monitoring metrics may be obtained from monitoring providers. In some implementations, the monitoring metrics may be obtained from a combination of cloud providers and monitoring providers. In some implementations, a list of monitoring metrics may be a human curated list of monitoring metrics.

The monitoring metrics may include error data, entries within log files, and any other information associated with parameters and metrics that are indicative of system performance and health as well as application performance and health.

The monitoring metrics can include metrics from multiple applications, and from multiple parts of an integrated software chain. Different components in the application stack may provide their own monitoring metrics. For example, application level metrics may be obtained that are associated with a particular application; monitoring metrics may be obtained from one or more load balancers that manage computing resources and may include metrics such as a number of connections, and metadata associated with each connection; an infrastructure provider, e.g., AWS, may provide monitoring metrics such as instance identifier(s), CPU usage per minute for each instance, and input/output (I/O) bytes associated with each instance, etc.

Example metrics may include CPU utilization, latency, memory utilization, Disk I/O for an application at an application and/or an instance level. Some monitoring metrics may be user experience based metrics, that may be obtained or inferred based on actual user experience with an application.

The monitoring metrics may be received from different cloud providers and/or monitoring providers. In some implementations, received monitoring metrics may be normalized to a single format (standard), which may be applied across all providers to enable comparison and combination of monitoring metrics received from different sources.

In some implementations, the monitoring metrics are received as time-series data associated with a particular time period (interval). In some implementations, additional normalization operations may be performed such that the time-series data of different monitoring metrics are synchronous and refer to the same time period.

In some implementations, the time-series data is obtained by querying a database where the time-series data is stored, e.g., an external data source at a cloud computing system or a cloud monitoring provider or third party provider. In some implementations, the time-series data may be obtained by querying a time-series database, e.g., database 210 described with reference to FIG. 2. In some implementations, the time-series data may be obtained from a monitoring solution and time series database, e.g., Victoria Metrics, Prometheus, etc. In some implementations, the time-series data may be obtained via a pull model wherein an initial request for data may originate from the cloud management system, which is then responded to by the database server.

The time series data may be obtained for multiple time intervals, e.g., time intervals of 2 days, 7 days, 3 months, 6 months, etc. In some implementations, different time intervals may be utilized for different applications and/or infrastructure providers.

In some implementations, normalization of the obtained monitoring metrics may be performed, e.g., if received from different sources that have different scales, units, etc. In some implementations, a topology of the distributed computing system may be inferred periodically, e.g., every 20 minutes, every 30 minutes, etc.

In some implementations, the metric data may be received that corresponds to a period of time that has already transpired, and is received with a delay. In some implementations, the metric data may be received in real-time, or near real-time.

In some implementations, the software application may be a serverless function. In a serverless computing environment, an execution model is provided for a distributed (cloud) computing system in which a cloud provider dynamically allocates, and then charges an enterprise user for the compute resources and storage needed to execute a function, application or code provided by the enterprise user. Serverless functions are event-driven, meaning the code provided by the enterprise user is invoked only when triggered by a request originating from a user and/or application.

In some implementations, the software application may be an application implemented over a set of virtual machines, e.g., similar to a system depicted in FIG. 4B. In a virtual computer system, computers are virtualized, e.g., software-based or virtual versions of a computer are created, each with dedicated amounts of CPU, memory and storage that are provided from a physical host computer. Configuration settings may be utilized to specify the amount of CPU, memory, and storage to be provided. In managing a virtual computing system, metric data may include data from multiple instances of the application that have previously executed on different virtual machines of the distributed computing system.

In some implementations, historical metric data associated with the software application may be obtained. The obtained historical metric data may be programmatically analyzed along with the first metric data to determine an allocation of a computing resource. In some implementations, it may be determined that the allocation of the computing resource is to be reduced from a first level of allocation based on the programmatic analysis.

Block 510 may be followed by block 520.

At block 520, it may be determined, based on the first metric data, that an allocation of a computing resource for the software application is to be reduced from a first level of allocation.

As described earlier, serverless systems and virtual systems are commonly configurable to enable a specified amount of one or more computing resources to be allocated. A cost of utilization may also be based on the specified amount of computing resources. In some implementations, the computing resource is an amount of memory allocated to the software application on the distributed computing system. In some implementations, the computing resource is a number of CPUs or CPU power allocated to the software application on the distributed computing system.

Different levels of configurability may be provided by a service provider associated with the distributed computing systems. For example, in some implementations, an allocation level of a particular computing resource may be utilized to select levels for other computing rescues. For example, an amount of Central Processing Units (CPU) power allocated to the software application may be based on a corresponding allocation of memory allocated (based on selection by an enterprise user) to the software application.

During run-time and use of the distributed computing system, a cloud management system, e.g., cloud management system 110 described with reference to FIG. 1, may be utilized to adjust a level of allocation of one or more computing resources. For example, in some implementations, based on an analysis of first metric data, it may be determined that the allocation is to be decreased from a first level of resource allocation for the computing resource.

In some implementations, the determination may also be made that the allocation is to be increased from a first level of allocation. For resources that have the opposite effect on performance, e.g., a resource whereby performance is improved by reducing an allocation of a particular resource, performance metrics are measured after increasing the allocation of the particular computing resource.

In some implementations, the determination that the allocation of the computing resource is to be reduced from the first level of allocation is based on a comparison of the first metric data to the obtained metric data for a test software application at the plurality of allocation setpoints, and determination of an optimal allocation setpoint for the computing resource based on the comparison, wherein the optimal allocation setpoint occurs at a lower level of resource allocation.

In some implementations, the optimal allocation setpoint for the computing resource may be based on an inflection point of the obtained metric data.

In some implementations, the determination, based on the first metric data, that an allocation of a computing resource for the software application is to be reduced from a first level of allocation may include providing the first metric data to a trained machine learning model model and receiving, from the trained machine learning model, a second level of allocation for the computing resource, wherein the second level of allocation is lower than the first level of allocation.

In some implementations, determination of an optimal and/or recommended setpoint may be based on performance as well as cost considerations. For example, in some situations, reducing a level of resource allocation may reduce performance, but not to the extent that it affects service level objectives (SLO) and/or target specifications for performance. Reducing the level of resource allocation may, however, reduce costs significantly. In such a scenario, it may be advantageous to reduce a level of resource allocation, e.g., memory, thereby incurring a loss of performance, but still realize a significant cost savings.

In some implementations, the determination of reduction of a level of resource allocation may be based on sensitivity weights associated with each performance metric and with each cost incurred during the execution of the software application. The sensitivity weights may be previously obtained, e.g., from an enterprise user, and stored in a database.

For example, in such a scenario, determining that the allocation of a computing resource for the software application is to be reduced from a first level of allocation may include a determination a second (and lower) level of allocation for the execution of the software application, and wherein a total cost of execution of the software application is lower at the second level of allocation when compared to the first level of allocation, and wherein the performance of the software application at the second level of allocation is lower when compared to the first level of allocation, and wherein the performance of the software application at the second level of allocation meets a service level performance threshold.

Block 520 may be followed by block 530. At block 530, an allocation of the computing resource for the software application may be increased to a second level of allocation greater than the first level of allocation. In some implementations, an allocation of a computing resource is first adjusted in an opposite direction to a direction or recommendation and/or a direction of intent of adjustment. This is to ensure that the eventual adjustment of allocation of the computing resource does not lead to performance degradation.

For example, an allocation of memory for a serverless function may be initially set to a level of 1024 MB. A determination/recommendation may be made to reduce the allocation to 512 MB. Per techniques of this disclosure, the allocation is increased, for example to 2048 MB, or to a next higher level of resource allocation setting based on provided settings.

The higher allocation may serve as an additional check and/or verification to ensure that performance of the software application may not degrade significantly when the allocation is reduced (lowered).

Block 530 may be followed by block 540.

At block 540, the software application is executed (or caused to be executed) on the distributed computing system at the second level of allocation. A trigger may be simulated or generated by the cloud management system to cause this execution for the purpose of obtaining metrics at the newly selected allocation level for the computing resource.

In some implementations, rather than cause the execution explicitly, the method may rely on an execution of the software application, at the new setting (second level of allocation) based on an actual event, e.g., based on a user request or other trigger event that causes execution of the software application at the new setting.

Block 540 may be followed by block 550.

At block 550, second metric data based on execution of the software application on the distributed computing system at the second level of allocation may be obtained.

The second metric data may be obtained via a query and/or API that provides the second metric data to the cloud management system. In some implementations, it may be obtained explicitly via a request or a query subsequent to the adjustment of the allocation level, whereas in some other implementations it may be obtained at a previously configured (e.g., normal or usual) frequency of obtaining the metric as part of monitoring by the cloud management system.

In some implementations the second metric data may include a smaller number (set) of metrics than elements in the first metric data. For example, a recommendation to adjust (reduce) an allocation level may be made based on an analysis of multiple metrics, whereas the second metric data may only include a single metric.

At block 560, it is determined whether the second metric data is indicative of performance improvement for the software application when compared to the first metric data.

The determination of performance improvements may be made keeping thresholds in mind, and may be made on an aggregate basis, once a threshold number of datapoints (of the second metric data) is obtained.

If it is determined that the second metric data is not indicative of performance improvement for the software application when compared to the first metric data, then block 560 may be followed by block 570, else block 560 may be followed by block 580.

At block 570, an allocation of the computing resource may be reduced to a third level that is lower than the first level, e.g., based on a determination that the second metric data does not indicate a performance improvement for the software application when compared to the first metric data.

In some implementations, the third level of resource allocation may be the actual recommended resource allocation level, e.g., a level determined per block 520. In some other implementations, the third level of resource allocation may be an intermediate level of resource allocation between the first level and a recommended level and the process of reducing a resource allocation may be implemented by a series of sequential operations that progressively adjust the allocation of the computing resource.

At block 580, the allocation is maintained at the first level of allocation, e.g., not reduced to a third level of allocation.

For example, if a recommendation was received to reduce an allocation of a computing resource from a first level to a third level, per techniques of this disclosure, an adjustment is made to a second level that is higher than the first level. If the performance metric for the software application at the second level is indicative of a performance improvement, e.g. improvement in performance metrics that meets a predetermined threshold, the recommendation, e.g., to reduce the resource allocation may not be implemented, e.g., allocation may not be reduced to the third level per the recommendation and instead may be maintained at the first level of allocation, or may be maintained at the second level of allocation.

In some implementations, if it is determined that the second metric data is indicative of performance improvement for the software application when compared to the first metric data, the allocation level may be maintained at the second level of allocation. This determination may be made upon evaluation of cost considerations, SLO levels, etc.

In some implementations, aggregation of metric data over multiple cycles of received metric data may be utilized before making a change to an allocation setting.

Blocks 510-580 can be performed (or repeated) in a different order than described above and/or one or more steps can be omitted. For example, in some implementations, block 540 may be omitted, and block 530 may be followed by block 550 based on the software application executing on the distributed computing system based on a user/application trigger than specifically be caused to be executed by the cloud management system.

Blocks 530-580 may be repeated sequentially to reduce an allocation from a first level to a third level, fourth level, etc. via a sequence of steps wherein the reduction of resource is implemented in a series of stages. At each stage, a previous allocation level may be revisited to ensure no performance degradation occurs due to the reduction of computing resource allocation.

Similarly, blocks 530-580 may also be adapted to implement a change in resource allocation settings when it is determined that the allocation of a computing resource is to be increased, rather than reduced. In such a case, based on a determining, based on the first metric data, that an allocation of a computing resource for the software application is to be reduced from a first level of allocation, an allocation of the computing resource for the software application is decreased to a second level of allocation lower than the first level of allocation, executing or causing the execution of the software application on the distributed computing system at the second level of allocation; obtaining second metric data based on execution of the software application on the distributed computing system at the second level of allocation; and increasing allocation of the computing resource to a third level that is greater than the first level based on a determination that the second metric data does not indicate a performance improvement for the software application when compared to the first metric data.

In some implementations, blocks 510-580 may be performed periodically based on previously received metric, traffic, and performance data to generate recommendations for resource allocations, e.g., of memory, provision concurrency, etc. In some implementations, the recommendations may be autonomously implemented by the cloud management system.

Figure 6:
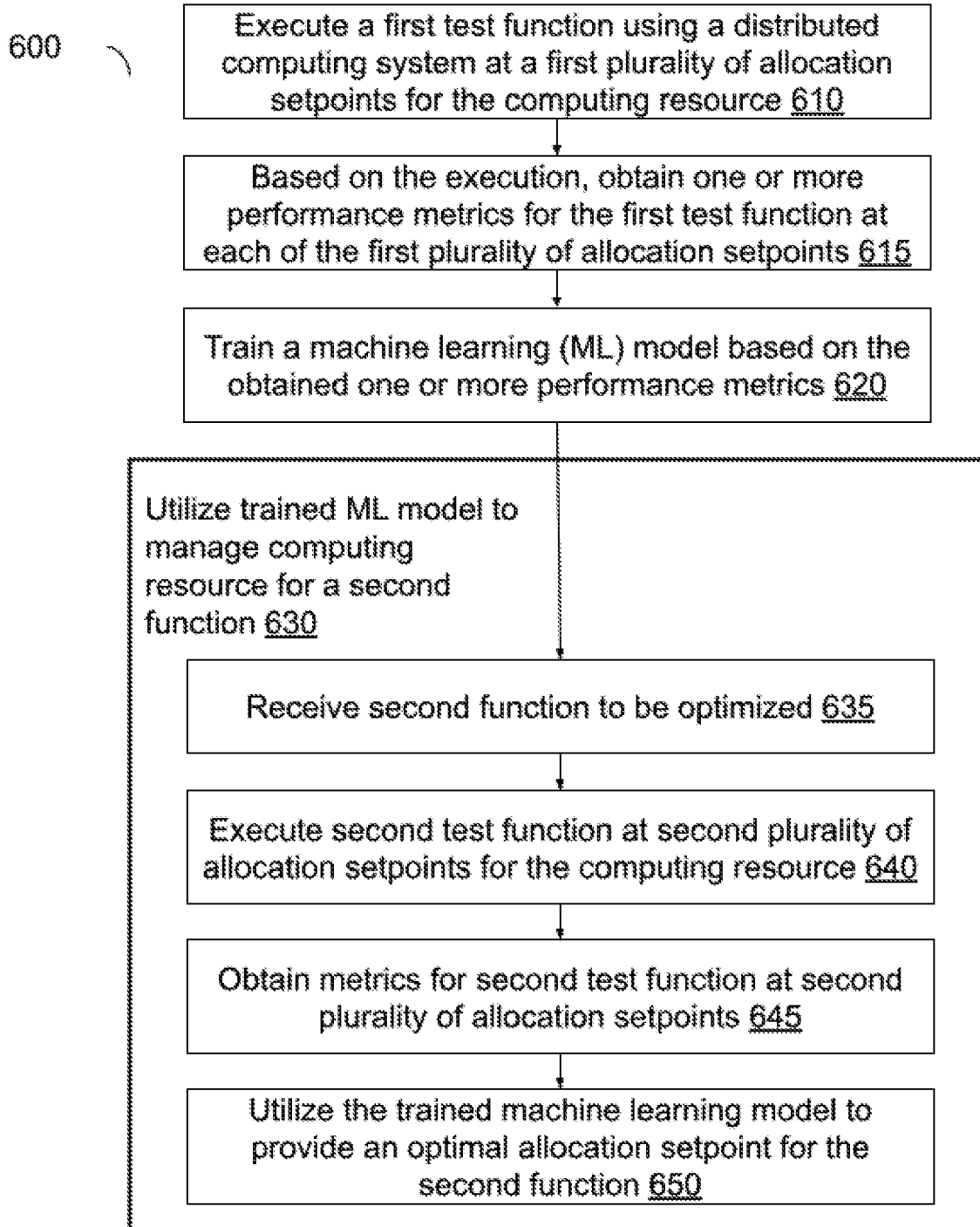
FIG. 6 is a flowchart illustrating an example method to manage a computing resource for a distributed computing system, in accordance with some implementations.

FIG. 6 is a flowchart illustrating an example method to manage a computing resource for a distributed computing system, in accordance with some implementations.

In some implementations, method 600 can be implemented, for example, on cloud management system 110 described with reference to FIG. 1. In some implementations, some or all of the method 600 can be implemented on one or more of cloud enterprise computer systems 160, on cloud computing system 130, on cloud monitoring system 140, as shown in FIG. 1, on and/or on a combination of the systems. In the described examples, the implementing system includes one or more digital processors or processing circuitry ("processors"), and one or more storage devices (e.g., databases 210, 220 or other storage). In some implementations, different components of one or more servers and/or clients can perform different blocks or other parts of the method 600. In some examples, a first device is described as performing blocks of method 600. Some implementations can have one or more blocks of method 600 performed by one or more other devices (e.g., other client devices or server devices) that can send results or data to the first device.

In some implementations, the method 600, or portions of the method, can be initiated automatically by a system. In some implementations, the implementing system is a first device. For example, the method (or portions thereof) can be periodically performed, or performed based on one or more particular events or conditions, e.g., reception of new software application (function), reception of a new release or update of a software application, at a predetermined time, a change in configuration one or more elements of a distributed computing system, a predetermined time period having expired since the last performance of method 600, and/or one or more other conditions or events occurring which can be specified in settings read by the method.

Processing may begin at block 610.

At block 610, a first test function may be executed using the distributed computing system at a first plurality of allocation setpoints for the computing resource.

In some implementations, each setpoint of the first plurality of allocation setpoints is associated with a corresponding setting for a single computing resource, e.g., memory, CPU, etc. In some other implementations, each setpoint of the first plurality of allocation setpoints is associated with a corresponding setting for a plurality of computing resources, e.g., n-tuples of memory, CPU, etc.

In some implementations, an allocation level for a computing resource may be based on an allocation level for another computing resource. For example, an amount of CPU provided by a serverless function may be automatically linked to a selection of an allocation level for memory, and may not be specifically selected by a user.

In some implementations, the allocation setpoints may be multidimensional, e.g., configurable for each available computing resource, e.g., memory, CPU, storage, etc.

Selection of the first (test) function may be determined based on complete utilization of resources, and designed such that no user provided function is likely to obtain a better (or worse) performance metric at a corresponding allocation of a computing resource.

In some implementations, two or more more test functions may be utilized which can provide an upper as well as a lower bound for the performance versus resource curve for a set of received functions.

Block 610 may be followed by block 615.

At block 615, based on the execution, one or more performance metrics for the first test function for each of the first plurality of allocation setpoints are obtained.

The performance metrics may include one or more performance metrics utilized to characterize performance of the software application over the distributed computing systems, and may include both backend metrics and user facing metrics. In some implementations, the one or more performance metrics may include one or more of latency, a time of execution for the software application, a cold start time for the software application, a total execution time for the software application, a user centric processing time that is indicative of a total wait time for a user that triggered the software application, etc.

Block 615 may be followed by block 620.

At block 620, a machine learning model may be trained based on the obtained one or more performance metrics.

In some implementations, training the machine learning model may include providing feedback to the machine learning model based on a comparison between a predicted performance metric and a corresponding obtained performance metric of the one or more performance metrics. In some implementations, the obtained one or more metrics may be denoised, e.g., provided to a filter, before being provided to the machine learning model.

In some implementations, training the machine learning model may include training the machine learning model to determine an order of a polynomial function that characterizes performance of the first test function. The order may be determined based on a fit of each of the obtained performance metrics over the first plurality of allocation setpoints.

In some implementations, training the machine learning model may include training the machine learning model based on the obtained one or more performance metrics by fitting a third order polynomial function to the obtained performance metrics over the first plurality of setpoints.

In some implementations, a non-polynomial or other function may be utilized to fit the obtained performance metrics to determine a mathematical or statistical model for the performance metrics for the first test function based on the corresponding obtained one or more performance metrics.

Block 620 may be followed by block 630.

At block 630, the trained machine learning model may be utilized to manage the computing resource for a second function. The second function may be a new function that is received from an enterprise user, or may be a new release of an existing function. In some implementations, a set of functions may be retrieved from a monitoring or version control system for analysis with the trained machine learning model. In some implementations, historical metrics associated with a second function may also be obtained.

Block 630 may be followed by block 635.

At block 635, the second function to be optimized may be received.

Block 635 may be followed by block 640.

At block 640, the second function may be executed using the distributed computing system at a second plurality of allocation setpoints for the computing resource. In some implementations, the second plurality of allocation setpoints comprises a fewer number of setpoints compared to the first plurality of allocation setpoints.

For example, the first plurality of allocation setpoints may span the entire available options of allocation setpoints, whereas only a subset of those may be utilized as the second plurality of allocation setpoints. This may enable a quick analysis and determination of an optimal operating point, rather than sweep an entire solution space of allocation setpoints In some implementations, the setpoints in the second plurality of setpoints may include setpoints that are also included in the first plurality of setpoints to enable an easy comparison, e.g., a visual comparison. In some implementations, the setpoints in the second plurality of setpoints may include setpoints that are not included in the first plurality of setpoints, and an extrapolation may be performed for comparison.

Block 640 may be followed by block 645.

At block 645, one or more performance metrics for the second function are obtained for each of the second plurality of allocation setpoints.

Block 645 may be followed by block 650.

At block 650, the trained machine learning model may be utilized to provide a recommendation of a setpoint for the computing resource for the second function based on an optimal allocation setpoint.

In some implementations, the optimal allocation setpoint may be determined by fitting a polynomial function to the obtained performance metrics for the second function for each of the second plurality of allocation setpoints. The polynomial function may be of an order determined based on previous fitting of a known function, e.g., a first test function. Based on the fitted polynomial function, the optimal allocation setpoint for the one or more performance metrics may be determined for the second (received) function.

In some implementations, fitting the polynomial function of the determined order to the obtained performance metrics for the second function may include fitting the polynomial function to the obtained performance metrics for the second function such that no portion of the fitted polynomial function based on the second function intersects with the polynomial function based on the test function.

Test functions such as the first function are selected such that they fully utilize computing resources, and are designed such that they offer the lowest performance operating points for a particular setting of a computing resource. When a second function, e.g., a received function for evaluation, is executed, and its performance indicates better metrics, it may be indicative of a noisy and/or erroneous reading. Using the test function performance metrics as a lower bound mitigates a risk of propagating an erroneous reading and/or noise. In some cases, a metric datapoint of a second function that crosses the bound may be excluded. In some limitations, the metric datapoint may be set to the corresponding data point of the test function (limited to that of the test function), and in some implementations, it may set to be offset by a distance based on other data points obtained for the second function, and a relative distance of the other data points from the corresponding metric data for the test function.

In some implementations, a plurality of test functions may be characterized for their performance over a set of allocation setpoints, each with a different set of characteristics. A model, e.g., mathematical/statistical/Machine Learning model may be determined for each of the performance metrics for multiple test functions. When a second function is received for evaluation, a suitable function of the plurality of test functions may be selected to match the received function, and the analysis may be performed for the selected suitable function.

In some implementations, a first test function may be characterized by repeating for a plurality of providers, regions, computing environments, etc.

Based on the determined optimal allocation setpoint, a recommendation of a setpoint for the computing resource for the second function may be provided (generated), e.g., via an alert, or via a user interface.

Blocks 610-650 can be performed (or repeated) in a different order than described above and/or one or more steps can be omitted. For example, in some implementations, block 610 may be omitted, and processing can proceed directly based on metrics stored in a database, e.g., databases 210 and/or 220 described with reference to FIG. 2.

In some implementations, an autonomous action may be undertaken to implement the provided recommendation of the allocated resource setpoint for the second function.

Implementation of a recommendation may include obtaining first metric data based on the second function executing the first level of allocation; increasing allocation of the computing resource to a second level of allocation greater than the first level of allocation; executing or causing the execution of the second function on the distributed computing system at the second level of allocation; obtaining second metric data based on the second function executing on the distributed computing system; and reducing allocation of the computing resource to a third level of allocation lower than the first level of allocation based on a determination that the second metric data does not indicate an improvement over the first metric data.

The metric data may also include data associated with errors, traffic arrival patterns, etc. In some implementations, a distributed computing system may offer concurrency handling, wherein a specified amount of computing resources (threads) are reserved and kept active for a particular enterprise client, and wherein a cold start time may be avoided when handling a query/request. This may provide superior performance when handling requests, but comes at a cost. A number of parallel concurrent compute processes (computes) to be reserved for the client is an additional input to be provided by the enterprise client. Reserving concurrent compute processes that are un-utilized or under-utilized can be disadvantageous to the enterprise client.

In some implementations, a cloud management system may provide a recommendation based on a previous history of execution of the software applications in the distributed computing system, e.g., serverless system.

Historical and seasonal traffic patterns may be obtained by a processor associated with the cloud management system, and based on cost data and traffic patterns, e.g., request arrivals as a function of time, etc., a recommendation may be provided that optimizes cost and performance based on the expected traffic pattern(s).

In some implementations, a recommendation for provisional concurrency may be based on a concurrency setpoint at which the utilization of the software application in the distributed computing system meets a predetermined threshold. In some implementations, the predetermined threshold may be about 60% of provisioned time utilization.

In some implementations, a traffic pattern to analyze a maximum number of parallel function requests (calls) requested for a particular function. A provisional concurrency setting may be determined that is based on the maximum number of parallel requests received in a predetermined time, e.g., previous 24 hour period, previous week, previous month, etc. In some implementations, a provisional concurrency setting may be based on a percentage of the maximum number of parallel requests received during a period, e.g., 75%, 50%, 125%, 150%, etc.

Figure 7:
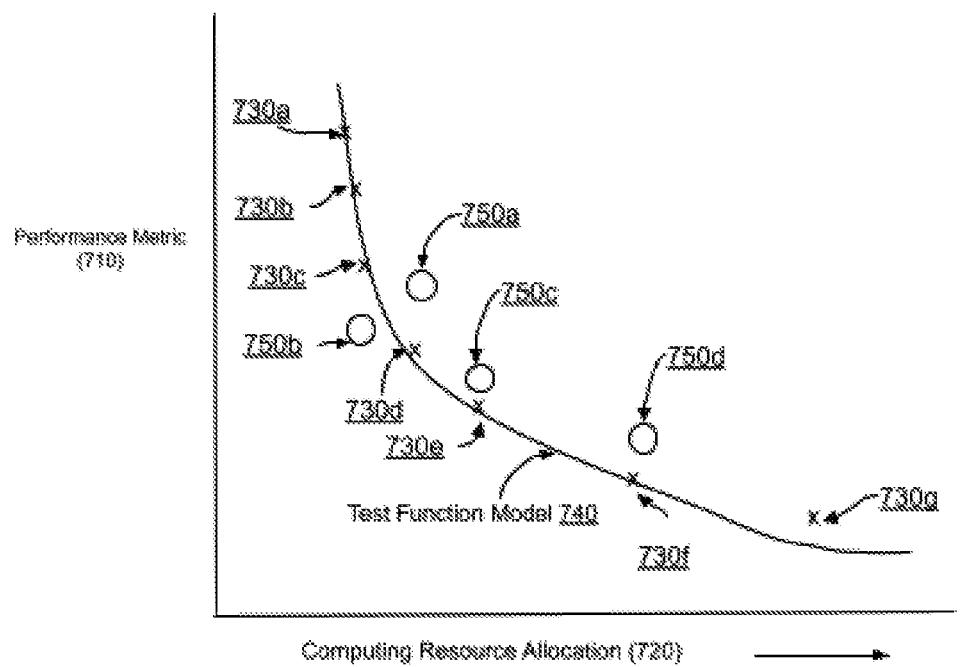
FIG. 7 illustrates an example plot of a performance metric obtained at different resource allocation setpoints for different software applications (functions) implemented in a distributed computing system.

FIG. 7 illustrates an example plot of a performance metric obtained at different resource allocation setpoints for different software applications (functions) implemented in a distributed computing system. The X-axis represents a computing resource allocation 720, e.g., an amount of memory allocated to the software application, while the Y-axis represents a performance metric 710 obtained at different computing resource allocation setpoints, e.g., at each selected memory allocation. In this illustrative example, the performance metric may be indicative of improved performance when the values are low, e.g., latency, and a lower latency number for a software function may indicate superior performance when compared to a higher latency number.

Per techniques of this disclosure, and as described with reference to FIG. 6, performance metric values 730*a*-730*g* are obtained for a first function, e.g., a test function. As can be seen from FIG. 6, as increased resources are allocated, the latency metric numbers decrease, but also start plateauing, i.e. an increased resource allocation does not always lead to a proportionate or corresponding increase in performance (decrease in latency).

The test function model 740 is a graph of a fitted model based on the obtained performance metric values.

Data Points 750*a*-750*d* are performance metrics values for a second function, for example, a new function or an updated release of a function, for an enterprise user.

As can be seen, the performance metric for the received function also follows the trend of improved performance, i.e., lower metric values as resources increase. The numbers also lie to the right of the test function model, with the exception of 750*b* which lies to the left of the curve, i.e., indicative of better performance at the same resource (memory) allocation.

As described with reference to FIG. 6, fewer data points are obtained for received (second) functions when compared to test (first) functions to improve computational efficiency and to offer quicker results.

Per techniques of this disclosure, points 750*a*, 750*c*, and 750*d* are used as they are measured (recorded) to determine the model. In some implementations, 750*b* may not be used as recorded since it may be noisy and erroneous.

In some implementations, the model for the received function may be determined wherein the value of point 750*b* is replaced by a corresponding value of the test function at that resource allocation point, e.g., by a value corresponding to point 730*c*.

In some implementations, the model for the received function may be determined wherein point 750*b* may be excluded during the model determination.

In some implementations, the model for the received function may be determined by setting a value for point 750*b* based on the distance of other points of the second function (e.g., 750*a*, 750*c*, and 750*d*) from corresponding points obtained for the test function, e.g., 730*d*, 730*e*, and 730*f*), or a model value at the corresponding points.

The fitted model for the received function may be utilized to determine an optimal point of operation.

Figure 8:
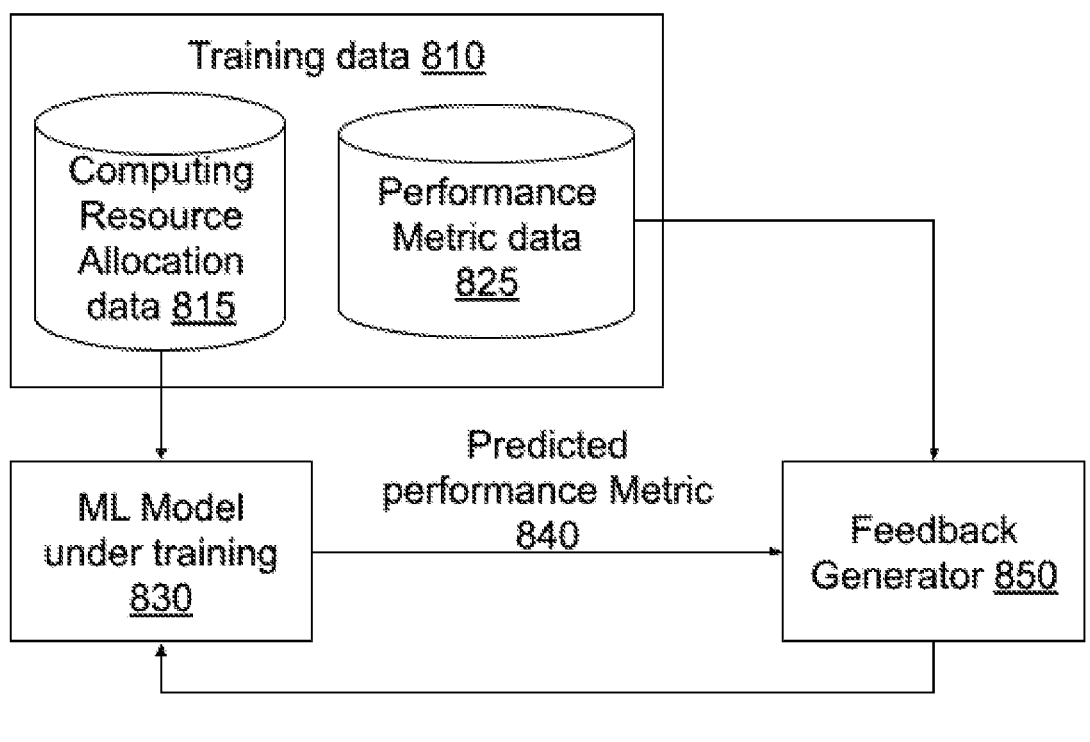
FIG. 8 is a block diagram illustrating an example of supervised machine learning (ML) to predict a performance metric for a software application, in accordance with some implementations.

FIG. 8 is a block diagram illustrating an example of supervised machine learning (ML) to predict a performance metric for a software application, in accordance with some implementations.

The supervised machine learning can be implemented on a computer that includes one or more processors and memory with software instructions. In some implementations, the one or more processors may include one or more of a general purpose central processing unit (CPU), a graphics processing unit (GPU), a machine-learning processor, an application-specific integrated circuit (ASIC), a field-programmable gate array (FPGA), or any other type of processor.

In this illustrative example, supervised learning is used to train a machine learning (ML) model 830 based on training data 810 and a feedback generator 850. ML model 830 may be implemented using any suitable machine learning technique, e.g., a feedforward neural network (FNN), a convolutional neural network (CNN), or any other suitable type of neural network. In some implementations, other machine learning techniques such as Bayesian models, support vector machines, hidden Markov models (HMIs), etc. can also be used to implement ML model 830.

The training data 810 includes computing resource allocation data 815 for one or more software applications and corresponding performance metric data 825. The computing resource allocation data may include any computing resource allocation data, e.g., data described with respect to FIG. 7. The computing resource allocation data and corresponding performance metric data may be obtained from a time-series database, from a monitoring system, etc.

In this illustrative example, computing resource allocation data 815 are provided to a machine learning (ML) model under training 830. The ML model generates a predicted performance metric 840 based on a current state of the ML model and the computing resource allocation data, e.g. metric values such as latency, start-up time, etc. For example, the ML model may determine a feature vector (or embedding) based on features of computing resource allocation data 815. The feature vector (or embedding) may be a mathematical, multi-dimensional representation generated based on the computing resource allocation data 815.

ML model 830 may generate a predicted performance metric for the software application based on the computing resource allocation data associated with the software application, e.g., based on the feature vector, and/or based on similarity with feature vectors of other software applications and performance metrics associated with those other software applications.

The predicted performance 840 generated by ML model 830 is provided to feedback generator 850.

Feedback generator 850 is also provided with the groundtruth performance metric 825 corresponding to the software application—as measured and/or reported. Feedback 560 is generated by feedback generator 850 based on a comparison of the predicted score with the groundtruth performance metric. For example, if predicted performance 840 is within a predetermined threshold distance of a groundtruth performance 825, positive feedback may be provided as feedback 860, while if the scores are far apart and outside a threshold distance, negative feedback is provided to the ML model under training, which may be updated based on the received feedback using reinforcement learning techniques.

In some implementations, the ML model includes one or more neural networks. The neural network(s) may be organized into a plurality of layers including a plurality of layers. Each layer may comprise a plurality of neural network nodes. Nodes in a particular layer may be connected to nodes in an immediately previous layer and nodes in an immediately next layer. In some implementations, the ML model may be a convolutional neural network (CNN).

The training of the ML model may be performed periodically at specified intervals, or may be triggered by events. In some implementations, the training may be repeated until a threshold level of performance prediction accuracy is reached.

Figure 9:
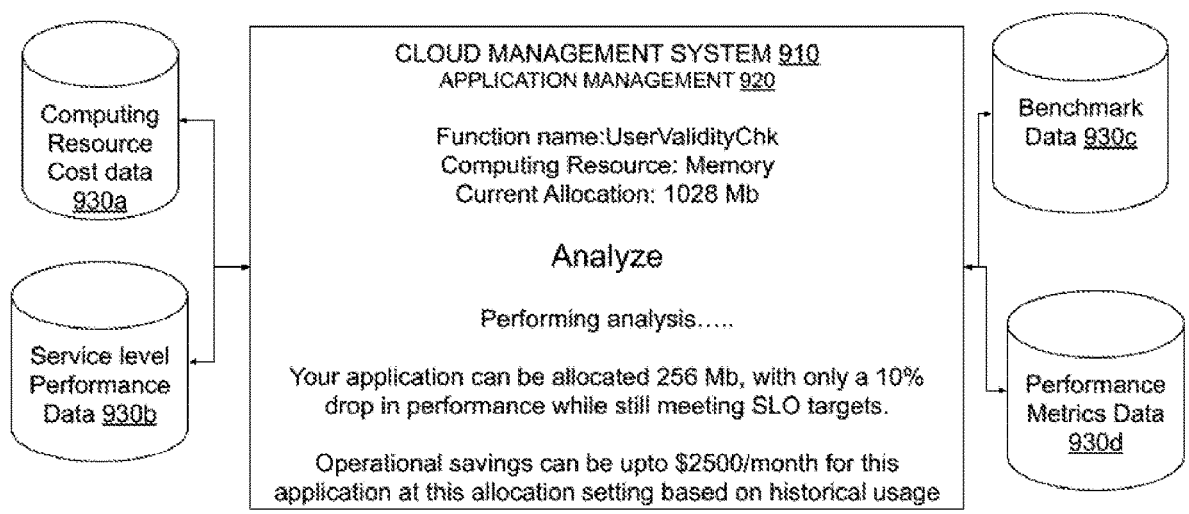
FIG. 9 depicts an example screenshot of a cloud management system, in accordance with some implementations.

FIG. 9 depicts an example screenshot of a cloud management system, in accordance with some implementations.

As depicted in FIG. 9, the cloud management system can be utilized for the optimization and management of software applications. The cloud management system utilizes computing resource cost data 930*a*, service level performance data 930*b*, benchmark data 930*c*, and performance metrics data 930*d* to optimize and manage software applications.

In this illustrative example, a screenshot is depicted of an example application management 920 is used.

An example software application, in this case, a serverless function is allocated 1028 MB of memory. Based on an analysis, e.g., at a user request, or as part of a periodic autonomous analysis, it is determined that the function may be allocated a lower resource allocation, e.g., 256 Mb, leading to a cost reduction, while only experiencing a relatively small drop in performance, e.g. 10%. It is further determined that the SLO targets would still be met.

An estimated savings from this reduction of resource allocation is also provided, e.g., $2500/month based on available data 930.

In some implementations, such analysis may be autonomously performed, and allocations dynamically adjusted based on historically observed traffic patterns, cost data, metrics data, etc.

Figure 10:
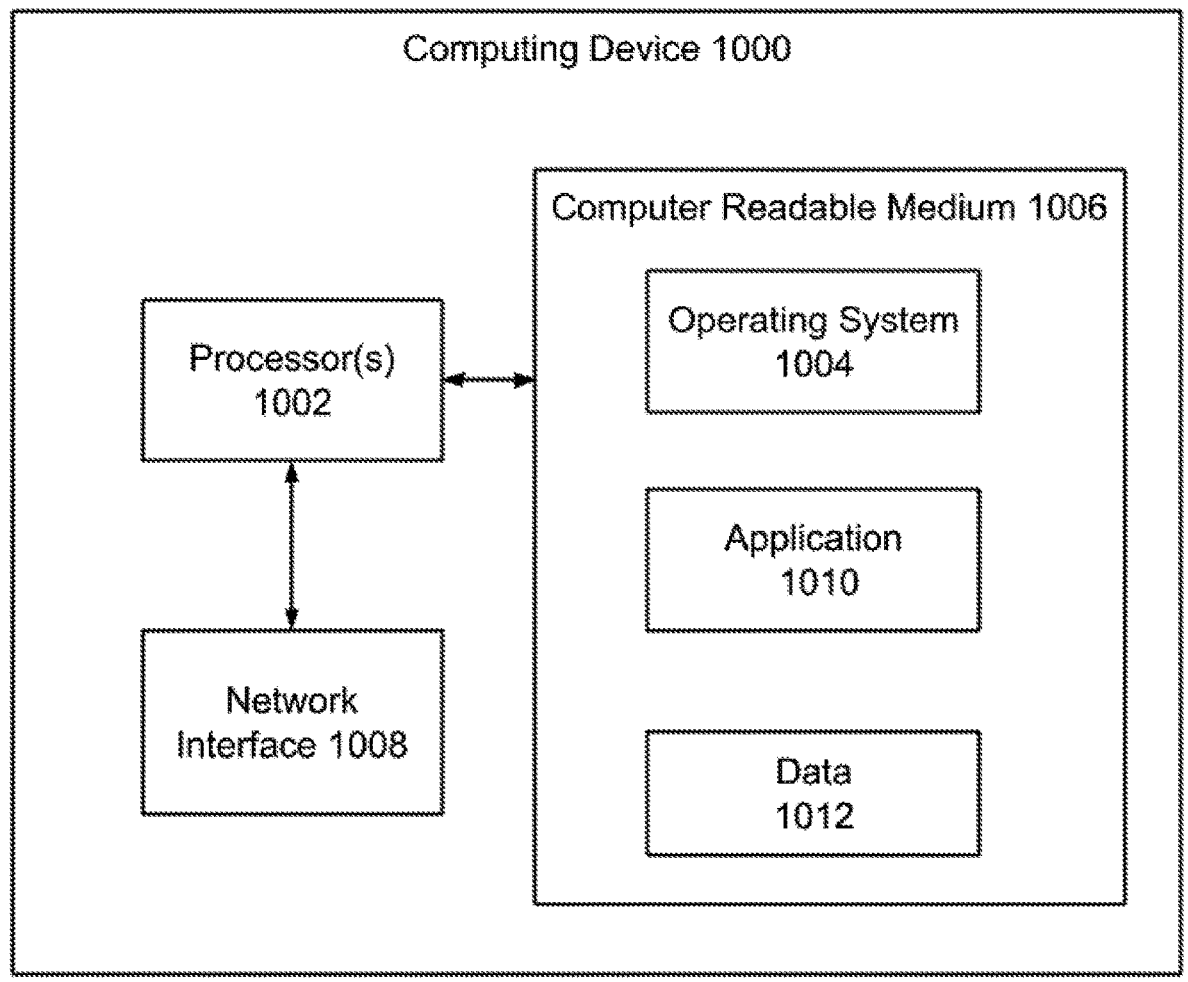
FIG. 10 is a block diagram illustrating an example computing device, in accordance with some implementations.

FIG. 10 is a block diagram of an example computing device 1000 which may be used to implement one or more features described herein. In one example, device 1000 may be used to implement a computer device (e.g. 110, 130, 140, and/or 160 of FIG. 1), and perform appropriate method implementations described herein. Computing device 1000 can be any suitable computer system, server, or other electronic or hardware device. For example, the computing device 1000 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 1000 includes a processor 1002, a memory 1004, input/output (I/O) interface 1006, and audio/video input/output devices 1014.

Processor 1002 can be one or more processors and/or processing circuits to execute program code and control basic operations of the device 1000. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Computer readable medium (memory) 1006 is typically provided in device 1000 for access by the processor 1002, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1002 and/or integrated therewith. Memory 1004 can store software operating on the server device 1000 by the processor 1002, including an operating system 1004, one or more applications 1010 and application data 1012. In some implementations, application 1010 can include instructions that enable processor 1002 to perform the functions (or control the functions of) described herein, e.g., some or all of the methods described with respect to FIGS. 5 and 6.

Elements of software in memory 1006 can alternatively be stored on any other suitable storage location or computer-readable medium. In addition, memory 1006 (and/or other connected storage device(s)) can store instructions and data used in the features described herein. Memory 1006 and any other type of storage (magnetic disk, optical disk, magnetic tape, or other tangible media) can be considered "storage" or "storage devices."

An I/O interface can provide functions to enable interfacing the server device 1000 with other systems and devices. For example, network communication devices, storage devices and input/output devices can communicate via the interface. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 10 shows one block for each of processor 1002 and memory 1006. These blocks may represent one or more processors or processing circuitries, operating systems, memories, I/O interfaces, applications, and/or software engines. In other implementations, device 1000 may not have all of the components shown and/or may have other elements including other types of elements instead of, or in addition to, those shown herein. While the cloud management system 110 or cloud computing system 130 is described as performing operations as described in some implementations herein, any suitable component or combination of components of cloud management system system 110, cloud computing system 130, or similar system, or any suitable processor or processors associated with such a system, may perform the operations described.

A user device can also implement and/or be used with features described herein. Example user devices can be computer devices including some similar components as the device 1000, e.g., processor(s) 1002, memory 1006, etc. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices, for example, can be connected to (or included in) the device 1000 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods 500 and 600) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A method to manage a computing resource allocation for a software application implemented on a distributed computing system, comprising:
   receiving first metric data associated with the software application executing on a distributed computing system;
   determining, based on the first metric data, that an allocation of a computing resource for the software application is to be reduced from a first level of allocation;
   increasing allocation of the computing resource for the software application to a second level of allocation greater than the first level of allocation;
   executing or causing the execution of the software application on the distributed computing system at the second level of allocation;
   obtaining second metric data based on execution of the software application on the distributed computing system at the second level of allocation; and
   reducing allocation of the computing resource to a third level that is lower than the first level based on a determination that the second metric data does not indicate a performance improvement for the software application when compared to the first metric data.

2. The method of claim 1, further comprising:
obtaining historical metric data associated with the software application;
programmatically analyzing the obtained historical metric data and the first metric data; and
determining that the allocation of the computing resource is to be reduced from a first level of allocation based on the programmatic analysis.

3. The method of claim 1, wherein the computing resource is memory allocated to the software application on the distributed computing system.

4. The method of claim 1, wherein a quantity of Central Processing Units (CPU) power allocated to the software application is based on a corresponding allocation of memory allocated to the software application.

5. The method of claim 1, wherein the distributed computing system is a serverless computing system, and wherein the software application is a function or package configured to be executable on the serverless computing system.

6. The method of claim 1, further comprising:
obtaining metric data for a second software application at a plurality of allocation setpoints for the computing resource, and wherein determining that the allocation of the computing resource is to be reduced from the first level of allocation is based on a comparison of the first metric data to the obtained metric data for the second software application at the plurality of allocation setpoints; and
determining an optimal allocation setpoint for the computing resource based on the comparison.

7. The method of claim 1, wherein determining, based on the first metric data, that an allocation of a computing resource for the software application is to be reduced from a first level of allocation comprises:
providing the first metric data to a trained machine learning model model; and
receiving, from the trained machine learning model, a second level of allocation for the computing resource, wherein the second level of allocation is lower than the first level of allocation.

8. The method of claim 1, wherein determining that the allocation of a computing resource for the software application is to be reduced from a first level of allocation comprises determining a second level of allocation for the execution of the software application, and wherein a total cost of execution of the software application is lower at the second level of allocation when compared to the first level of allocation, and wherein the performance of the software application at the second level of allocation is lower when compared to the first level of allocation, and wherein the performance of the software application at the second level of allocation meets a service level performance threshold.

9. A non-transitory computer-readable medium comprising instructions that, responsive to execution by a processing device, causes the processing device to perform operations comprising:
receiving first metric data associated with a software application executing on a distributed computing system;
determining, based on the first metric data, that an allocation of a computing resource for the software application is to be reduced from a first level of allocation;
increasing allocation of the computing resource for the software application to a second level of allocation greater than the first level of allocation;
executing or causing the execution of the software application on the distributed computing system at the second level of allocation;
obtaining second metric data based on execution of the software application on the distributed computing system at the second level of allocation; and
reducing allocation of the computing resource to a third level that is lower than the first level based on a determination that the second metric data does not indicate a performance improvement for the software application when compared to the first metric data.

10. The non-transitory computer-readable medium of claim 9, wherein the computing resource is memory allocated to the software application on the distributed computing system.

11. The non-transitory computer-readable medium of claim 9, wherein the distributed computing system is a serverless computing system, and wherein the software application is a function or package configured to be executable on the serverless computing system.

12. The non-transitory computer-readable medium of claim 9, wherein the operations further comprise:
obtaining metric data for a second software application at a plurality of allocation setpoints for the computing resource, and wherein determining that the allocation of the computing resource is to be reduced from the first level of allocation is based on a comparison of the first metric data to the obtained metric data for the second software application at the plurality of allocation setpoints; and
determining an optimal allocation setpoint for the computing resource based on the comparison.

* * * * *